United States Patent
Smith

(10) Patent No.: US 11,998,133 B2
(45) Date of Patent: *Jun. 4, 2024

(54) COOKING DEVICE HAVING A COOKING VESSEL AND A CERAMIC HEATER

(71) Applicant: LEXMARK INTERNATIONAL, INC., Lexington, KY (US)

(72) Inventor: Jerry Wayne Smith, Irvine, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,658

(22) Filed: Apr. 26, 2023

(65) Prior Publication Data

US 2023/0255386 A1  Aug. 17, 2023

Related U.S. Application Data

(63) Continuation of application No. 16/782,327, filed on Feb. 5, 2020, now Pat. No. 11,666,170.

(Continued)

(51) Int. Cl.
*A47J 36/04* (2006.01)
*A47J 27/00* (2006.01)
(Continued)

(52) U.S. Cl.
CPC ............. *A47J 27/004* (2013.01); *A47J 27/02* (2013.01); *A47J 36/04* (2013.01); *F24C 15/005* (2013.01);
(Continued)

(58) Field of Classification Search
CPC .......... A47J 27/004; A47J 27/02; A47J 36/04; F24C 15/005; F24C 15/32; F28D 15/0275; H05B 3/141; H05B 3/265
See application file for complete search history.

(56) References Cited

U.S. PATENT DOCUMENTS 4,222,026 A  9/1980  Heiney, III et al.
6,518,549 B1  2/2003  Taylor et al.
(Continued)

FOREIGN PATENT DOCUMENTS

EP  2863769 B1  8/2017
WO  2006054080 A2  5/2006

OTHER PUBLICATIONS

Non-Final Office Action dated Mar. 6, 2023 for U.S. Appl. No. 17/147,907 (Smith et al.).
(Continued)

*Primary Examiner* — Alfred Basichas

(57) ABSTRACT

A cooking vessel according to one example embodiment includes a food receptacle for holding food during cooking. The cooking vessel includes an inner shell and an outer shell. An outside surface of the inner shell forms the food receptacle. A portion of an inside surface of the inner shell is spaced from a portion of an inside surface of the outer shell forming a sealed volume between the inner shell and the outer shell. A heat pipe is positioned within the sealed volume between the inner shell and the outer shell for distributing heat through the sealed volume between the inner shell and the outer shell. Embodiments include those wherein each of the inner shell and the outer shell includes a respective bottom wall and a respective side wall.

9 Claims, 6 Drawing Sheets

Related U.S. Application Data

(60) Provisional application No. 62/802,955, filed on Feb. 8, 2019.

(51) Int. Cl.
| | |
|---|---|
| *A47J 27/02* | (2006.01) |
| *F24C 15/00* | (2006.01) |
| *F24C 15/32* | (2006.01) |
| *F28D 15/02* | (2006.01) |
| *H05B 3/14* | (2006.01) |
| *H05B 3/26* | (2006.01) |
| *F24C 7/06* | (2006.01) |
| *H05B 1/02* | (2006.01) |
| *H05B 3/76* | (2006.01) |

(52) U.S. Cl.
CPC .......... *F24C 15/32* (2013.01); *F28D 15/0275* (2013.01); *H05B 3/141* (2013.01); *H05B 3/265* (2013.01); *A47J 2202/00* (2013.01); *F24C 7/067* (2013.01); *H05B 1/0202* (2013.01); *H05B 3/76* (2013.01)

(56) References Cited

U.S. PATENT DOCUMENTS

| | | | |
|---|---|---|---|
| 7,241,131 | B1 | 7/2007 | Booth et al. |
| 11,666,170 | B2 * | 6/2023 | Smith .................. F24C 15/32 99/447 |
| 2003/0186183 | A1 | 10/2003 | Ito et al. |
| 2004/0149718 | A1 | 8/2004 | Ito et al. |
| 2009/0044823 | A1 | 2/2009 | Overend et al. |
| 2013/0098389 | A1 | 4/2013 | Uwano |
| 2015/0335120 | A1 | 11/2015 | Moore et al. |
| 2018/0014618 | A1 | 1/2018 | Ohgi et al. |

OTHER PUBLICATIONS

Final Office Action dated Apr. 5, 2023 for U.S. Appl. No. 17/147,921 (Smith et al.).

Final Office Action dated Jul. 19, 2023 for U.S. Appl. No. 17/147,907 (Smith et al.).

Non-final office action dated Apr. 3, 2023 for U.S. Appl. No. 16/782,308 (Bayerle et al.).

* cited by examiner

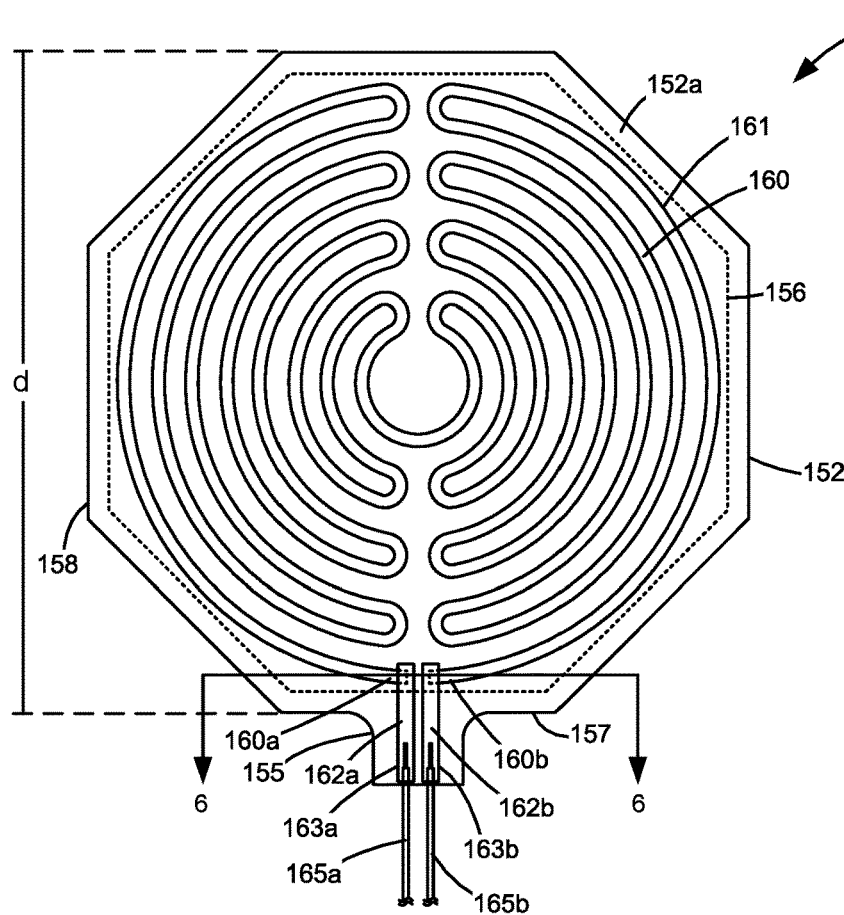
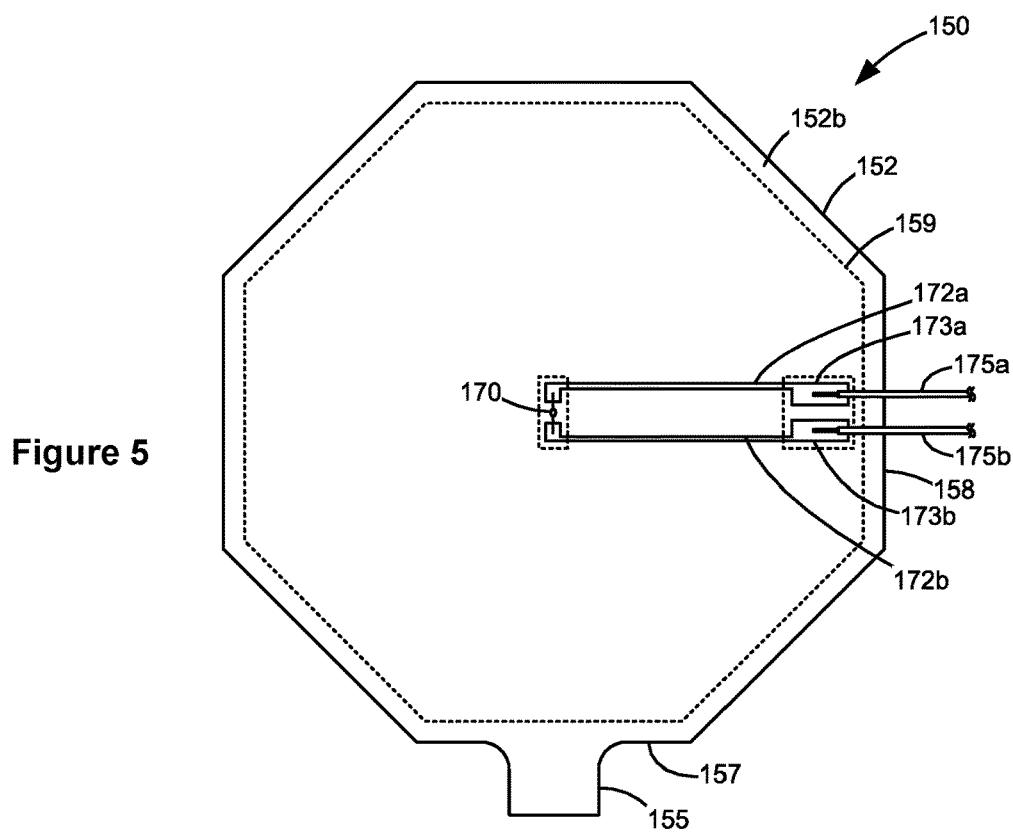

COOKING DEVICE HAVING A COOKING VESSEL AND A CERAMIC HEATER

CROSS REFERENCES TO RELATED APPLICATIONS

This application is a continuation application of U.S. patent application Ser. No. 16/782,327, filed Feb. 5, 2020, entitled "Cooking Device Having a Cooking Vessel and a Ceramic Heater," which claims priority to U.S. Provisional Patent Application Ser. No. 62/802,955, filed Feb. 8, 2019, entitled "Heat Pipe Cooking Vessel," the content of which is hereby incorporated by reference in its entirety.

BACKGROUND

1. Field of the Disclosure

The present disclosure relates generally to cooking devices and more particularly to a cooking device having a cooking vessel and a ceramic heater.

2. Description of the Related Art

Manufacturers of cooking devices, such as rice cookers, are continuously challenged to improve heating time and heating effectiveness. Most low-end rice cookers, for example, utilize a wire coil heater, such as nichrome wire, potted with ceramic cement inside a stainless steel sheath embedded inside a cast aluminum body. These heaters generate heat by passing electrical current through the nichrome wire. These types of heaters often suffer from long warmup and cooldown times due to the high thermal mass provided by the electrical insulation materials and the relatively large metal components. Furthermore, cooking vessels used with wire coil heaters typically have relatively low thermal mass resulting in poor distribution of heat within the cooking vessel.

Some high-end rice cookers utilize induction heaters to directly warm the cooking vessel instead of relying on convection or thermal conduction. Induction rice cookers use induction heating where current is passed through a metal coil to create a magnetic field. The cooking vessel is positioned within the magnetic field to induce electrical current in the cooking vessel which, in turn, generates heat. With induction heating, the heating temperature may be controlled by adjusting the strength of the magnetic field allowing for shorter warmup and cooldown times to be achieved. However, induction heaters are generally expensive due to the cost of the electrical materials and components, and the control systems for induction heaters are relatively complex and generally expensive as a result.

Accordingly, a cost-effective cooking device having improved thermal efficiency is desired.

SUMMARY

A cooking vessel according to one example embodiment includes a food receptacle for holding food during cooking. The cooking vessel includes an inner shell and an outer shell. An outside surface of the inner shell forms the food receptacle. A portion of an inside surface of the inner shell is spaced from a portion of an inside surface of the outer shell forming a sealed volume between the inner shell and the outer shell. A heat pipe is positioned within the sealed volume between the inner shell and the outer shell for distributing heat through the sealed volume between the inner shell and the outer shell.

Embodiments include those wherein each of the inner shell and the outer shell includes a respective bottom wall and a respective side wall. A portion of the bottom wall of the inner shell is spaced from a portion of the bottom wall of the outer shell and a portion of the side wall of the inner shell is spaced from a portion of the side wall of the outer shell such that the sealed volume extends between the bottom walls of the inner shell and the outer shell and between the side walls of the inner shell and the outer shell. In some embodiments, the side wall of the inner shell is integrally joined with the side wall of the outer shell along an upper rim of the cooking vessel sealing the sealed volume between the inner shell and the outer shell. In some embodiments, the heat pipe is positioned in a gap between the bottom walls of the inner shell and the outer shell and in a gap between the side walls of the inner shell and the outer shell for transferring heat received at an outside surface of the bottom wall of the outer shell from the gap between the bottom walls of the inner shell and the outer shell to the gap between the side walls of the inner shell and the outer shell.

Embodiments include those wherein the heat pipe includes a wick structure positioned on at least one of the inside surface of the inner shell and the inside surface of the outer shell. In some embodiments, the wick structure includes a sintered metal on at least one of the inside surface of the inner shell and the inside surface of the outer shell. In some embodiments, the wick structure includes an arc sprayed metal on at least one of the inside surface of the inner shell and the inside surface of the outer shell. In some embodiments, the wick structure includes a mesh positioned on at least one of the inside surface of the inner shell and the inside surface of the outer shell. In some embodiments, the wick structure includes grooves formed along at least one of the inside surface of the inner shell and the inside surface of the outer shell.

A cooking vessel according to another example embodiment includes a food receptacle configured to contain food during cooking. The cooking vessel includes an inner shell and an outer shell. An outside surface of the inner shell forms the food receptacle. A portion of an inside surface of the inner shell is spaced from a portion of an inside surface of the outer shell forming a sealed volume between the inner shell and the outer shell. A working fluid is positioned within the sealed volume between the inner shell and the outer shell sufficient to distribute heat through the sealed volume between the inner shell and the outer shell upon a portion of an outside surface of the outer shell receiving heat from a heating device.

BRIEF DESCRIPTION OF THE DRAWINGS

The accompanying drawings incorporated in and forming a part of the specification illustrate several aspects of the present disclosure and together with the description serve to explain the principles of the present disclosure.

FIGS. 4 and 5 are plan views of a top surface and a bottom surface, respectively, of a heater of the heater assembly shown in FIG. 3.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
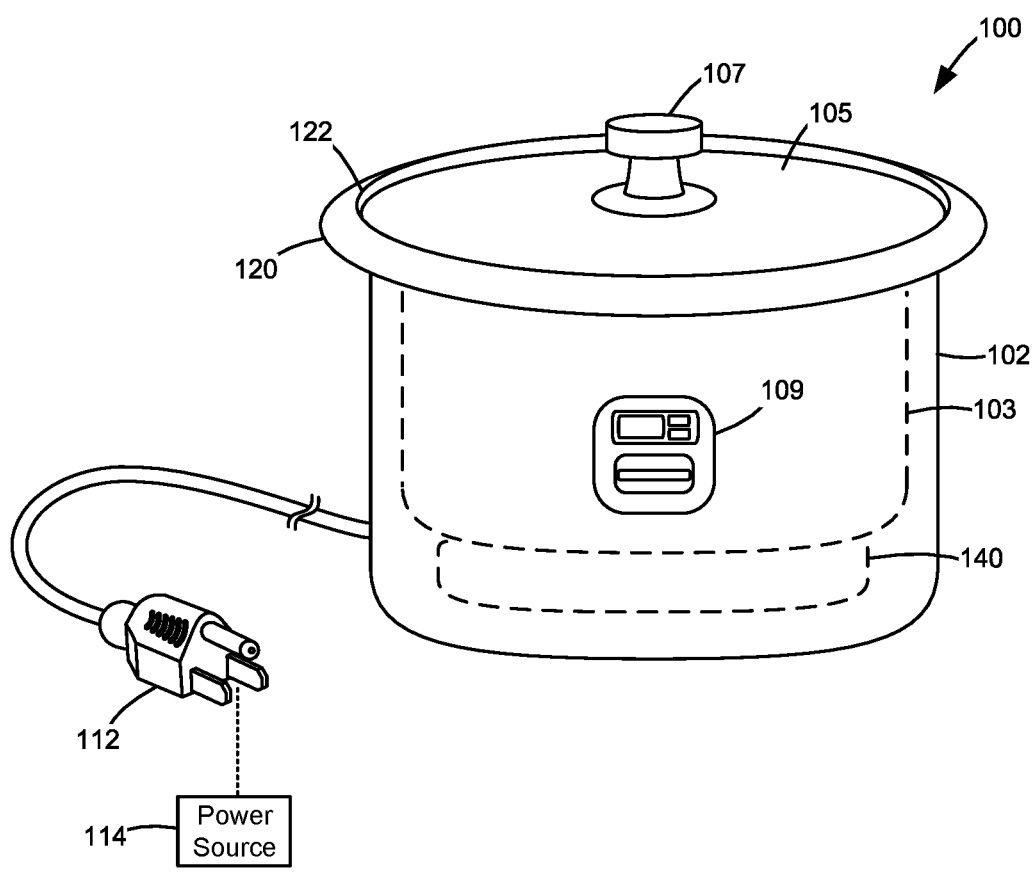
FIG. 1 is a perspective view of a cooking device according to one example embodiment.

Referring now to the drawings and particularly to FIG. 1, a cooking device 100 is shown according to one example embodiment. In the example embodiment illustrated, cooking device 100 includes a rice cooker. However, cooking device 100 may also include a pressure cooker, a steam cooker, etc. Cooking device 100 includes a housing 102, a cooking vessel 120, a lid 105, a heater assembly 140, and a user interface 109. Housing 102 includes an upper portion having a receptacle 103 for receiving cooking vessel 120 and a lower portion within which heater assembly 140 is mounted. In the embodiment illustrated, heater assembly 140 forms a receiving base of receptacle 103 such that cooking vessel 120 contacts and rests on top of heater assembly 140 when cooking vessel 120 is positioned within receptacle 103 so that heat generated by heater assembly 140 heats cooking vessel 120.

Cooking vessel 120 is generally a container (e.g., a bowl) having a food receptacle 121 in which food substances to be cooked, such as rice and water, are contained. That is, food receptacle 121 of cooking vessel 120 directly contacts and retains the food being cooked. Cooking vessel 120 may be composed of, for example, a metal having high thermal conductivity, such as stainless steel, aluminum or copper. Lid 105 covers the opening at a rim 122 of cooking vessel 120. Lid 105 includes a handle 107 preferably composed of a material having low thermal conductivity to provide a safe surface for the user to hold when using lid 105. User interface 109 is provided on a front portion of housing 102. User interface 109 may include one or more buttons, dials, knobs, etc. for receiving user input and/or a display or indicator lights for providing information about the functioning and status of cooking device 100 to a user. Cooking device 100 also includes a power cord 112 for connecting cooking device 100 to an external power source 114.

In one embodiment, during use, food receptacle 121 of cooking vessel 120 holds water and rice to cook, and heater 140 transfers heat to cooking vessel 120 to bring the water to boil. Once the water reaches a steady boil, the temperature of cooking vessel 120 remains generally stable. Once all of the water in cooking vessel 120 is absorbed by the rice and/or evaporated, the temperature of cooking vessel 120 tends to increase, triggering a mechanism inside cooking device 100 to either turn heater assembly 140 off or to switch to a reduced temperature warming cycle intended to keep the food in cooking vessel 120 warm.

Figure 2:
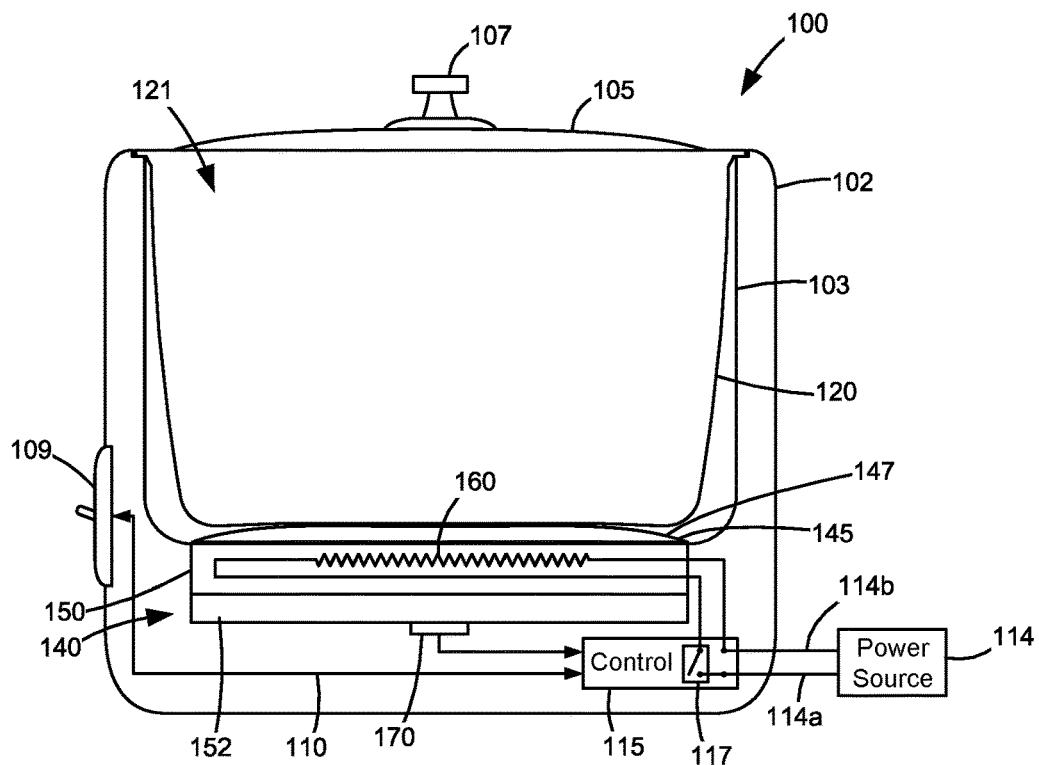
FIG. 2 is a schematic diagram of the cooking device according to one example embodiment.

With reference to FIG. 2, a schematic depiction of cooking device 100 is shown according to one example embodiment. Cooking device 100 includes heater assembly 140 including a heater 150 and a heating plate 145. Heater 150 includes a substrate 152 to which at least one resistive trace 160 is secured. Heat is generated when electrical current provided by power source 114 is passed through resistive trace 160. When cooking vessel 120 is disposed in receptacle 103, cooking vessel 120 contacts and rests on top of heating plate 145. Heating plate 145 is positioned in contact with, or in very close proximity to, heater 150 in order to transfer heat from heater 150 to cooking vessel 120. In some embodiments, thermal grease is applied between heater 150 and heating plate 145 to facilitate physical contact and heat transfer between heater 150 and heating plate 145. In some embodiments, a gap filler (e.g., silicon gap filler) or pad (e.g., graphite gap pad) is positioned between heater 150 and heating plate 145 to facilitate heat transfer between heater 150 and heating plate 145. Heating plate 145 is composed of, for example, a metal having high thermal conductivity, such as forged aluminum.

Cooking device 100 includes control circuitry 115 configured to control the temperature of heater 150 by selectively opening or closing a circuit supplying electrical current to resistive trace 160. Open loop or, preferably, closed loop control may be utilized as desired. In the embodiment illustrated, a temperature sensor 170, such as a thermistor, is coupled to substrate 152 for sensing the temperature of heater 150 and permitting closed loop control of heater 150 by control circuitry 115. Control circuitry 115 may include a microprocessor, a microcontroller, an application-specific integrated circuit, and/or other form integrated circuit. User interface 109 is communicatively coupled to control circuitry 115 via a communications link 110.

In the embodiment illustrated in FIG. 2, control circuitry 115 includes a switch 117 connected between one end of resistive trace 160 and a first terminal 114a of power source 114. Switch 117 may be, for example, a mechanical switch, an electronic switch, a relay, or other switching device. The other end of resistive trace 160 is connected to a second terminal 114b of power source 114. The temperature of heater 150 is controlled by measuring the temperature of substrate 152 by temperature sensor 170 held in contact with substrate 152 and feeding temperature information from temperature sensor 170 to control circuitry 115 which, in turn, controls switch 117 to selectively supply power to resistive trace 160 based on the temperature information. When switch 117 is closed, current flows through resistive trace 160 to generate heat from heater 150. When switch 117 is opened, no current flows through resistive trace 160 to pause or stop heat generation from heater 150. In some embodiments, control circuitry 115 may include power control logic and/or other circuitries for controlling the amount of power delivered to resistive trace 160 to permit adjustment of the amount of heat generated by heater 150 within a desired range of temperatures. For example, in some embodiments, when the temperature of heater 150 is low (e.g., under 100 degrees Celsius), heater 150 is supplied with 50% power and then gradually stepped up from 50% to 100% as the temperature of heater 150 increases.

Figure 3:
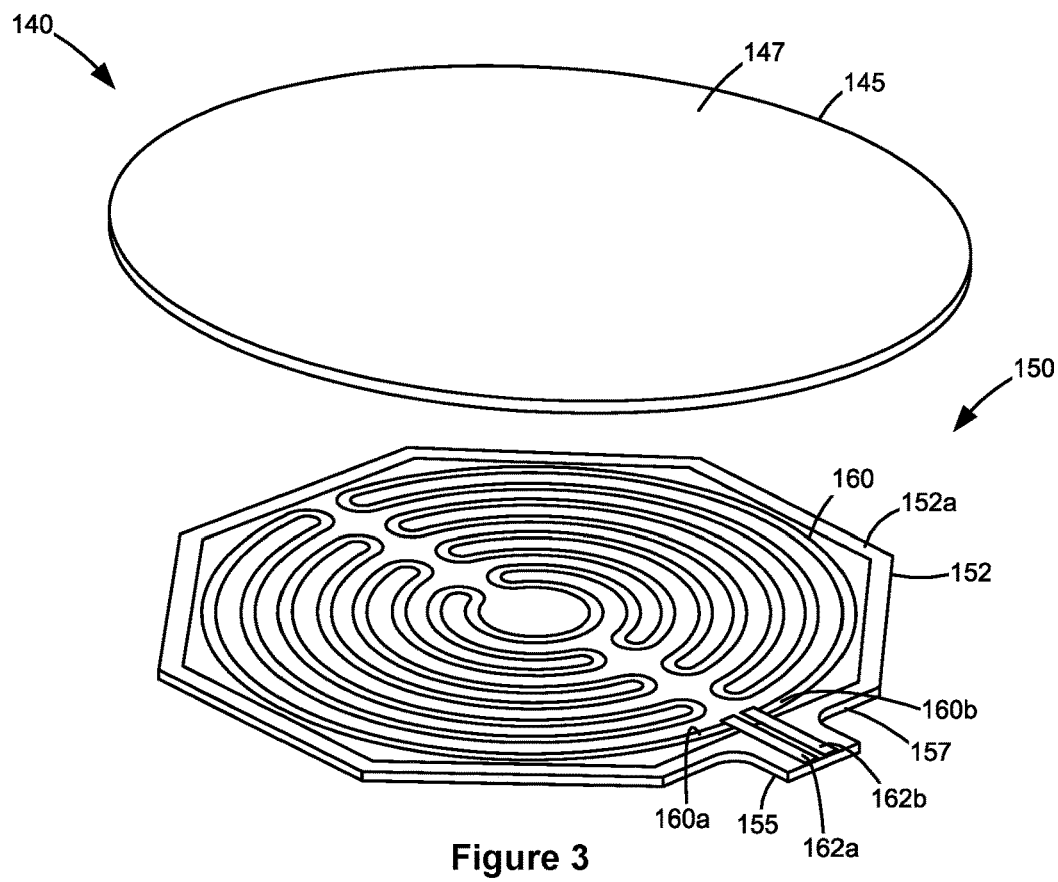
FIG. 3 is an exploded perspective view of a heater assembly of the cooking device according to one example embodiment.

FIG. 3 shows heater assembly 140 including heating plate 145 and heater 150 according to one example embodiment.

FIG. 4 shows a top view of heater 150, and FIG. 5 shows a bottom view of heater 150. In the example embodiment illustrated, heating plate 145 is formed as a circular disk having a domed upper surface 147 (also shown in FIG. 2 with exaggerated scale for illustration purposes). In one embodiment, heating plate 145 has a diameter of about 162 mm, a central portion having a thickness of about 5 mm, and a circumferential edge having a thickness of about 1 mm. In other embodiments, heating plate 145 may have other shapes as long as heating plate 145 is positioned to spread heat from heater 150 across the bottom surface of cooking vessel 120. The thermal conductivity and relative thinness of heating plate 145 result in a relatively low thermal mass, which reduces the amount of time required to heat and cool heating plate 145 and, in turn, cooking vessel 120.

Heater 150 includes substrate 152 constructed from ceramic or the like, such as aluminum oxide (e.g., commercially available 96% aluminum oxide ceramic). Hereinafter, substrate 152 is referred to as ceramic substrate 152. In some embodiments, heater 150 may include one or more layers of ceramic substrate 152. Where heater 150 includes a single layer of ceramic substrate 152, a thickness of ceramic substrate 152 may range from, for example, 0.5 mm to 1.5 mm, such as 1.0 mm. Where heater 150 includes multiple layers of ceramic substrate 152, each layer may have a thickness ranging from, for example, 0.5 mm to 1.0 mm, such as 0.635 mm. In the embodiment illustrated, ceramic substrate 152 is octagonal in shape having an incircle diameter d of about 147 mm. However, ceramic substrate 152 may take other suitable shapes depending on the application, such as, for example, circular, hexagonal, square, etc. In general, the octagonal shape illustrated is easier to reliably manufacture on a commercial basis than, for example, a circular shape.

Ceramic substrate 152 includes a top surface 152a that faces heating plate 145 and a bottom surface 152b opposite top surface 152a. In the embodiment illustrated, resistive trace 160 is positioned on top surface 152a of ceramic substrate 152. Resistive trace 160 includes a first end 160a and a second end 160b. In this embodiment, a pair of conductive traces 162a, 162b are also positioned on top surface 152a. Conductive traces 162a, 162b are connected to first and second ends 160a, 160b of resistive trace 160, respectively. Resistive trace 160 includes a suitable electrical resistor material such as, for example, silver palladium (e.g., blended 70/30 silver palladium). Conductive traces 162a, 162b include a suitable electrical conductor material such as, for example, silver platinum. In the embodiment illustrated, resistive trace 160 and conductive traces 162a, 162b are applied to ceramic substrate 152 by way of thick film printing. For example, resistive trace 160 may include a resistor paste having a thickness of 10-13 microns when applied to ceramic substrate 152, and conductive traces 162a, 162b may include a conductor paste having a thickness of 9-15 microns when applied to ceramic substrate 152. Resistive trace 160 forms the heating element of heater 150, and conductive traces 162a, 162b provide electrical connections to resistive trace 160 in order to supply an electrical current to resistive trace 160 to generate heat.

In the example embodiment illustrated, resistive trace 160 follows a serpentine pattern extending from first end 160a to second end 160b along top surface 152a of ceramic substrate 152. In this embodiment, the serpentine pattern formed by resistive trace 160 has a generally circular outer perimeter 161. Conductive traces 162a, 162b each form a respective terminal 163a, 163b of heater 150. Cables or wires 165a, 165b are connected to respective terminals 163a, 163b in order to electrically connect resistive trace 160 and conductive traces 162a, 162b to, for example, control circuitry 115 and power source 114 in order to selectively close the circuit formed by resistive trace 160 and conductive traces 162a, 162b to generate heat. Conductive trace 162a directly contacts first end 160a of resistive trace 160, and conductive trace 162b directly contacts second end 160b of resistive trace 160. Conductive traces 162a, 162b both extend along an extension portion 155 of ceramic substrate 152 that extends from an edge 157 of ceramic substrate 152 in the example embodiment illustrated, but conductive traces 162a, 162b may be positioned in other suitable locations on ceramic substrate 152 as desired. Portions of first and second ends 160a, 160b of resistive trace 160 obscured beneath conductive traces 162a, 162b in FIG. 4 are shown in dotted line. In this embodiment, current input to heater 150 at, for example, terminal 163a by way of conductive trace 162a passes through, in order, resistive trace 160 and conductive trace 162b where it is output from heater 150 at terminal 163b. Current input to heater 150 at terminal 163b travels in reverse along the same path.

In some embodiments, heater 150 includes temperature sensor 170, also referred to as thermistor 170, positioned in close proximity to a surface of heater 150 in order to provide feedback regarding the temperature of heater 150 to control circuitry 115. In the embodiment shown, thermistor 170 is positioned on bottom surface 152b of ceramic substrate 152. In the example embodiment illustrated, thermistor 170 is welded directly to bottom surface 152b of ceramic substrate 152. In this embodiment, heater 150 also includes a pair of conductive traces 172a, 172b that are each electrically connected to a respective terminal of thermistor 170. Each conductive trace 172a, 172b has a distal end that forms a respective terminal 173a, 173b adjacent to an edge 158 of ceramic substrate 152. Cables or wires 175a, 175b are connected to terminals 173a, 173b in order to electrically connect thermistor 170 to, for example, control circuitry 115 in order to provide closed loop control of heater 150. In the embodiment illustrated, thermistor 170 is positioned at a central location of bottom surface 152b of ceramic substrate 152. However, thermistor 170 and its corresponding conductive traces 172a, 172b may be positioned in other suitable locations on bottom surface 152b of ceramic substrate 152.

In some embodiments, heater 150 also includes a thermal cutoff (not shown), such as a bi-metal thermal cutoff, in contact with ceramic substrate 152 and connected in series with the heating circuit formed by resistive trace 160 and conductive traces 162a, 162b permitting the thermal cutoff to open the heating circuit formed by resistive trace 160 and conductive traces 162a, 162b upon detection by the thermal cutoff of a temperature that exceeds a predetermined amount. In this manner, the thermal cutoff provides additional safety by preventing overheating of heater 150.

Figure 6:
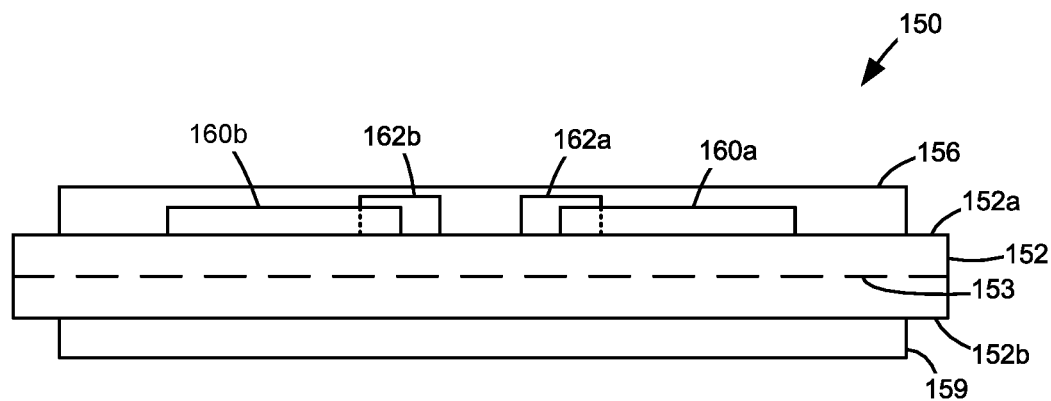
FIG. 6 is a cross-sectional view of the heater shown in FIGS. 4 and 5 taken along line 6-6 in FIG. 4.

FIG. 6 is a cross-sectional view of heater 150 taken along line 6-6 in FIG. 4. As shown, heater 150 includes resistive trace 160 and conductive traces 162a, 162b formed on ceramic substrate 152. FIG. 6 depicts a single layer of ceramic substrate 152. However, ceramic substrate 152 may include multiple layers as depicted by dashed line 153. In the embodiment illustrated, heater 150 includes one or more layers of printed glass 156 on top surface 152a of ceramic substrate 152. In the embodiment illustrated, glass layer 156 covers resistive trace 160 and portions of conductive traces 162a, 162b in order to electrically insulate such features to prevent electric shock or arcing. The borders of glass layer 156 are shown in dashed line in FIG. 4. In this embodiment, glass layer 156 covers resistive trace 160 and adjacent portions of ceramic substrate 152 such that glass layer 156 forms the majority of the top surface of heater 150 facing heating plate 145. An overall thickness of glass layer 156 may range from, for example, 35-45 microns.

In the embodiment illustrated, heater 150 also includes one or more layers of printed glass 159 on bottom surface 152b of ceramic substrate 152 to minimize camber. The borders of glass layer 159 are shown in dashed line in FIG. 5. In this embodiment, glass layer 159 does not cover thermistor 170 and some portions of conductive traces 172a, 172b because the relatively low voltage (in comparison with the voltages applied to resistive trace 160) applied to such features presents a lower risk of electric shock or arcing. An overall thickness of glass layer 159 may range from, for example, 35-45 microns.

In addition to providing electrical insulation, laminating the ceramic heater of the present disclosure with glass layers 156, 159 provides increased resistance to thermal shock. In some embodiments, heater 150 is fabricated by fiber laser scribing the perimeter of heater 150 to further increase thermal shock resistance. Fiber laser scribing tends to provide a more uniform singulation surface having fewer microcracks along the separated edge in comparison with conventional carbon dioxide laser scribing.

Heater 150 may be constructed by way of thick film printing. For example, in one embodiment, resistive trace 160 is printed on fired (not green state) ceramic substrate 152, which includes selectively applying a paste containing resistor material to top surface 152a of ceramic substrate 152 through a patterned mesh screen with a squeegee or the like. The printed resistor is then allowed to settle on ceramic substrate 152 at room temperature. The ceramic substrate 152 having the printed resistor is then heated at, for example, approximately 140-160 degrees Celsius for a total of approximately 30 minutes, including approximately 10-15 mins at peak temperature and the remaining time ramping up to and down from the peak temperature, in order to dry the resistor paste and to temporarily fix resistive trace 160 in position. The ceramic substrate 152 having temporary resistive trace 160 is then heated at, for example, approximately 850 degrees Celsius for a total of approximately one hour, including approximately 10 minutes at peak temperature and the remaining time ramping up to and down from the peak temperature, in order to permanently fix resistive trace 160 in position. Conductive traces 162a, 162b are then printed on top surface 152a of ceramic substrate 152, which includes selectively applying a paste containing conductor material in the same manner as the resistor material. The ceramic substrate 152 having the printed resistor and conductor is then allowed to settle, dried and fired in the same manner as discussed above with respective to resistive trace 160 in order to permanently fix conductive traces 162a, 162b in position. Glass layer(s) 156 on top surface 152a are then printed in substantially the same manner as the resistors and conductors, including allowing the glass layer(s) 156 to settle as well as drying and firing the glass layer(s) 156. In one embodiment, glass layer(s) 156 are fired at a peak temperature of approximately 810 degrees Celsius, slightly lower than the resistors and conductors. Conductive traces 172a, 172b for thermistor 170 are printed on bottom surface 152b of ceramic substrate 152 in substantially the same manner as conductive traces 162a, 162b, and glass layer(s) 159 are printed on bottom surface 152b of ceramic substrate 152 in substantially the same manner as glass layer(s) 156. Thermistor 170 is then mounted to ceramic substrate 152 in a finishing operation with the terminals of thermistor 170 directly welded to conductive traces 172a, 172b.

Thick film printing resistive trace 160 and conductive traces 162a, 162b on fired ceramic substrate 152 provides more uniform resistive and conductive traces in comparison with ceramic heaters having resistive and conductive traces printed on green state ceramic. The improved uniformity of resistive trace 160 and conductive traces 162a, 162b provides more uniform heating across heating plate 145 as well as more predictable heating of heater 150.

Figure 7:
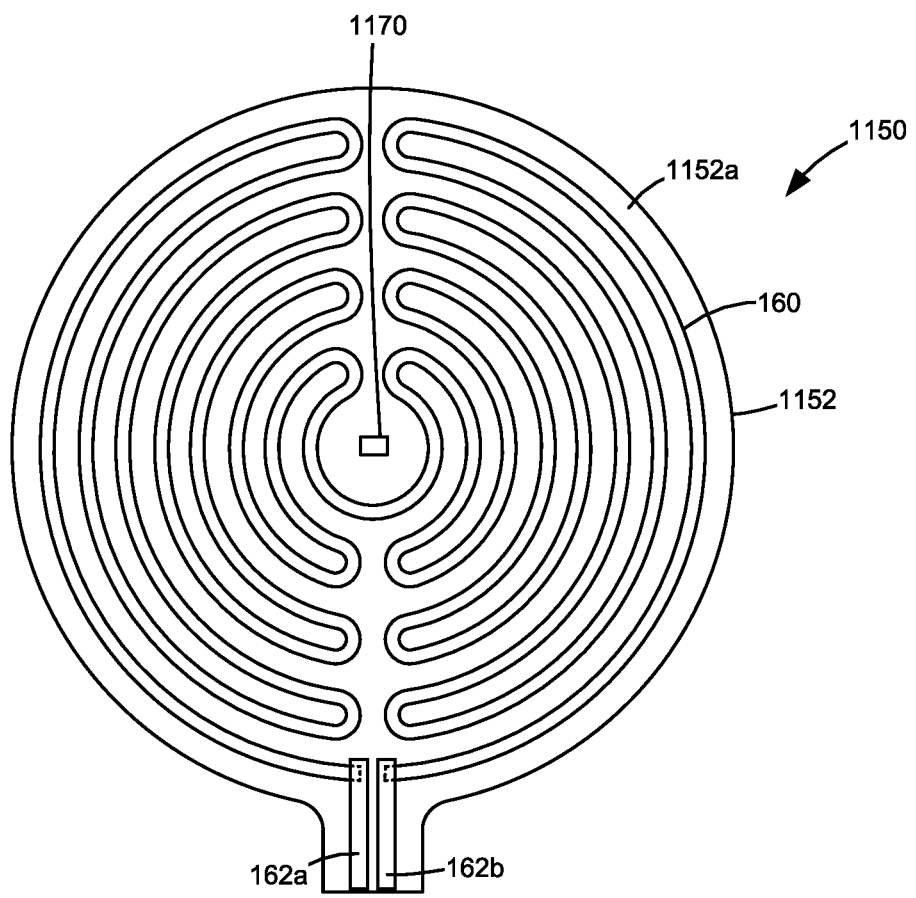
FIG. 7 is a plan view of a top surface of a heater according to another example embodiment.

While the example embodiment illustrated in FIGS. 3-5 includes heater 150 having an octagonal shape, in other embodiments, heater 150 may have other forms and shapes as desired. For example, with reference to FIG. 7, a heater 1150 may have a circular shape according to one example embodiment. Thermistor 170 is disposed on a surface of ceramic substrate 152 opposite the surface along which resistive trace 160 is disposed in the embodiment shown in FIG. 5, but thermistor 170 and/or its corresponding conductive traces may be disposed on the same side of ceramic substrate 152 as resistive trace 160 so long as they do not interfere with the positioning of resistive trace 160 and conductive traces 162a, 162b. For example, in FIG. 7, a thermistor 1170 is positioned on the same surface as resistive trace 160 (e.g., top surface 1152a of ceramic substrate 1152). In some embodiments, corresponding conductive traces of thermistor 170 may be disposed on the bottom surface (opposite top surface 1152a) of ceramic substrate 1152 while thermistor 1170 is positioned on top surface 1152a thereof. In this embodiment, heater 150 may include vias that are formed as through-holes substantially filled with conductive material extending through ceramic substrate 1152 from top surface 1152a to the bottom surface of ceramic substrate 1152 in order to electrically connect the terminals of thermistor 1170 on top surface 1152a to their corresponding conductive traces on the bottom surface.

It will be appreciated that the example embodiments illustrated and discussed above are not exhaustive and that the heater of the present disclosure may include resistive and conductive traces in many different patterns and locations on ceramic substrate 152, including resistive traces on one or more of the exterior surfaces (top surface and/or bottom surface) of ceramic substrate 152 and/or an intermediate surface of ceramic substrate 152, as desired. Other components (e.g., a thermistor) may be positioned on either the top surface or the bottom surface of the heater as desired, including on the same surface as the resistive traces or an opposite surface.

Figure 8:
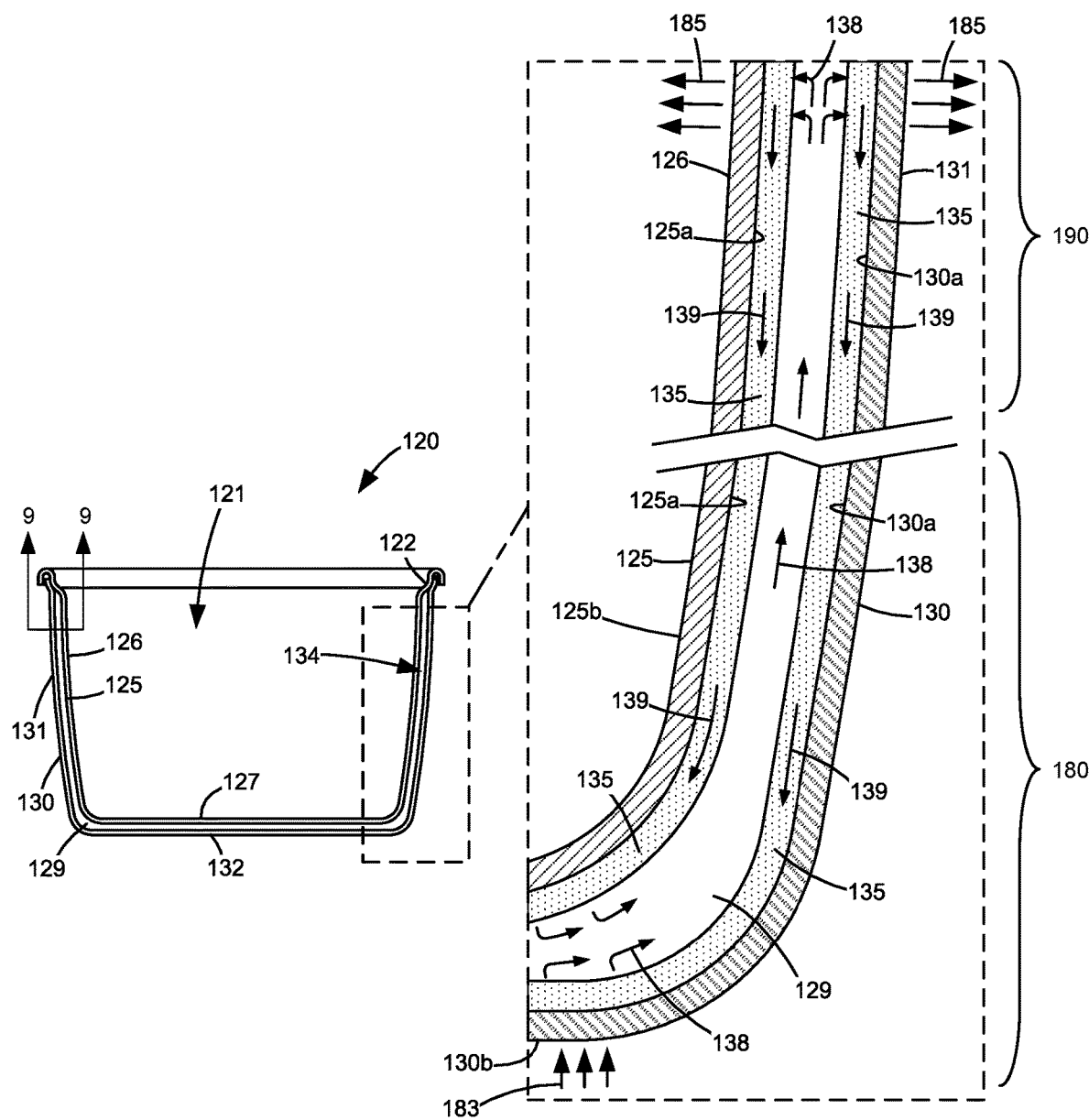
FIG. 8 is a cross-sectional view of a cooking vessel of the cooking device employing a heat pipe according to one example embodiment.

FIG. 8 shows a cooking vessel 120 suitable for use with heater assembly 140 according to one example embodiment. In the embodiment illustrated, cooking vessel 120 includes an inner shell 125 and an outer shell 130. An outside surface 125b of inner shell 125 forms food receptacle 121 of cooking vessel 120. Inner shell 125 and outer shell 130 have corresponding side walls 126, 131 and corresponding bottom walls 127, 132 separated by a gap 129 to form a dual-wall vessel. In this embodiment, bottom wall 132 of outer shell 130 has a slightly concave outside surface 130b that substantially matches domed upper surface 147 of heating plate 145. The use of a heating plate 145 having a domed upper surface 147 in contact with a concave outside surface 130b of the bottom wall 132 of cooking vessel 120 helps reduce bowing of bottom wall 132 of cooking vessel 120 during heating in comparison with a cooking vessel having a flat bottom surface in contact with a flat top surface of a heating plate or heater. This, in turn, helps upper surface 147 of heating plate 145 maintain consistent contact with outside surface 130b of the bottom wall 132 of cooking vessel 120 for heat transfer. Inner shell 125 and outer shell 130 are integrally joined or welded, e.g., at rim 122, forming a sealed volume between inner and outer shells 125, 130 that includes gap 129. In some embodiments, the sealed volume is formed under reduced pressure relative to atmospheric pressure, such as a partial vacuum.

Figure 9A:
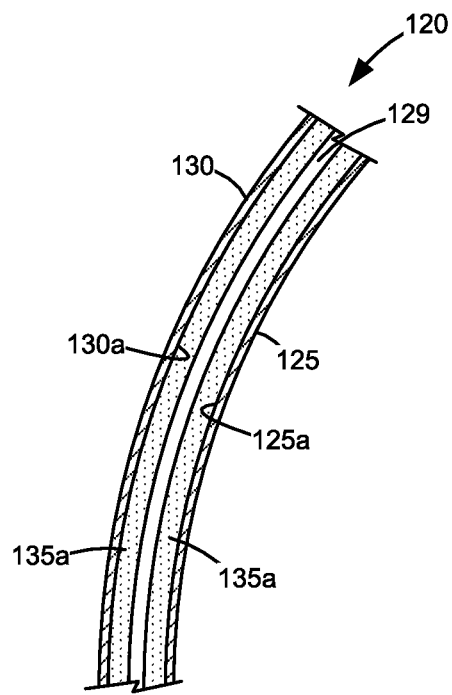
FIGS. 9A-9C are cross-sectional views of the cooking vessel shown in FIG. 8 taken along line 9-9 in FIG. 8 illustrating various example wick structures of the heat pipe.
Figure 9B:
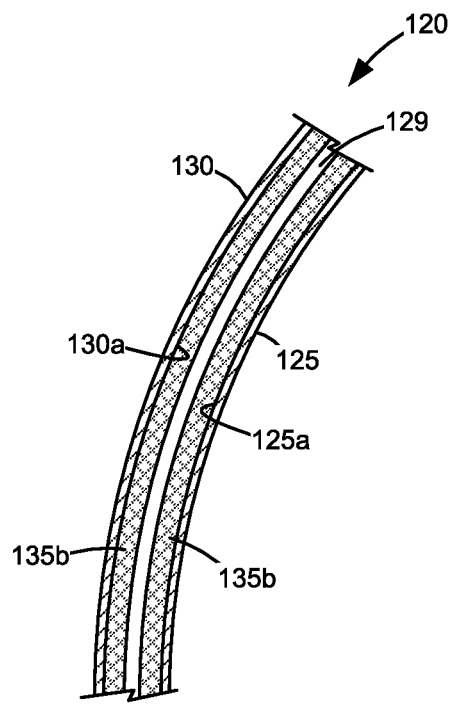
Figure 9C:
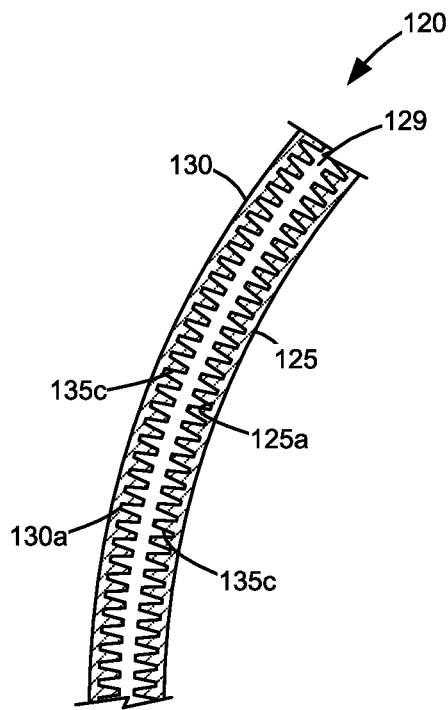

In the example embodiment illustrated, a heat pipe 134 is provided between inner and outer shells 125, 130, including between side walls 126, 131 and between bottom walls 127, 132. In the embodiment shown, corresponding inside surfaces 125a, 130a of inner and outer shells 125, 130 are lined with wick structures 135 containing a relatively small amount of working fluid, such as water. The wick structures 135 may be constructed from materials that allow capillary action of the working fluid within the sealed volume as discussed below. In FIGS. 9A-9C, various example wick structures for use with cooking vessel 120 are illustrated. Each of FIGS. 9A-9C is a cross-sectional view of cooking vessel 120 taken along line 9-9 in FIG. 8. In the embodiment shown in FIG. 9A, the wick structure includes sintered or arc sprayed metal 135a, such as copper or aluminum, provided on inside surfaces 125a, 130a of inner and outer shells 125, 130. In the embodiment shown in FIG. 9B, a screen or wire mesh 135b is provided on each of the inside surfaces 125a, 130a of inner and outer shells 125, 130 to form the wick structure. In the embodiment shown in FIG. 9C, grooves 135c are formed on each of the inside surfaces 125a, 130a of inner and outer shells 125, 130 to provide the wick structure. Each groove 135c extends substantially vertically along a respective side wall 126, 131 and may continue substantially horizontally along a respective bottom wall 127, 132. While the example embodiments illustrated include a heat pipe 134 that includes one or more wick structures 135 and a working fluid, in other embodiments, heat pipe 134 includes a working fluid (e.g., water) contained between inner and outer shells 125, 130, but no wick structure.

In one embodiment, during use, the working fluid cycles between an evaporation zone 180 near or around the lower region of cooking vessel 120 that is directly heated by heating plate 145 and a condensation zone 190 around the upper region of cooking vessel 120. In particular, as cooking vessel 120 is heated by heater assembly 140 (e.g., by outside surface 130b of bottom wall 132 of outer shell 130 receiving heat from heater assembly 140) the working fluid within the evaporation zone 180 (e.g., working fluid within the wick structures 135 between bottom walls 127, 132 of inner and outer shells 125, 130 and between side walls 126, 131 of inner and outer shells 125, 130 in the lower region of cooking vessel 120) absorbs heat 183 and changes state from liquid to vapor 138. Driven by pressure and temperature differences between the lower (hotter) region and upper (cooler) region, vapor 138 travels from the evaporation zone 180 to the condensation zone 190 along the gap 129 between wick structures 135. When vapor 138 arrives at the condensation zone 190, it condenses back into liquid form releasing latent heat 185 through inner and outer shells 125, 130 at the upper region of cooking vessel 120. Condensed liquid 139 at the condensation zone 190 travels back to the evaporation zone 180 via wick structures 135 due to capillary action. As the vaporization and condensation cycle repeats, heat is transferred from locations near the heat source to the rest of the sealed volume of cooking vessel 120 (i.e., from between bottom walls 127, 132 of inner and outer shells 125, 130 to between side walls 126, 131 of inner and outer shells 125, 130) resulting in an improved temperature uniformity within cooking vessel 120.

The present disclosure provides a ceramic heater having a low thermal mass in comparison with the heaters of conventional cooking devices. In particular, a thick film printed resistive trace on a ceramic substrate provides reduced thermal mass in comparison with conventional wire coil heaters. The use of a thin heating plate, such as forged aluminum, also provides reduced thermal mass in comparison with the cast aluminum bodies of conventional wire coil heaters. The low thermal mass of the ceramic heater of the present disclosure allows the heater, in some embodiments, to heat to an effective temperature for use in a matter of seconds (e.g., less than 5 seconds), significantly faster than conventional wire coil heater cooking devices. The low thermal mass of the ceramic heater of the present disclosure also allows the heater, in some embodiments, to cool to a safe temperature after use in a matter of seconds (e.g., less than 5 seconds), again, significantly faster than conventional wire coil heater cooking devices.

Further, embodiments of the heater of the cooking device of the present disclosure operate at a more precise and more uniform temperature than conventional cooking devices because of the closed loop temperature control provided by the thermistor in combination with the relatively uniform thick film printed resistive and conductive traces. The low thermal mass of the ceramic heater permits greater energy efficiency in comparison with conventional wire coil heaters. The improved temperature control and temperature uniformity also improve the performance of the cooking device of the present disclosure. In this manner, embodiments of the cooking device of the present disclosure achieve high thermal and energy efficiency and high-end performance comparable to induction heating cooking devices, but at a greatly reduced cost in comparison with conventional induction heating cooking devices.

The present disclosure further provides a heat pipe cooking vessel for use with the ceramic heater. The heat pipe structure within the cooking vessel provides improved thermal conductivity in comparison with conventional aluminum or copper cooking vessels allowing for a more uniform temperature distribution and effective heat transfer. Coupled with the low thermal mass of the ceramic heater, the heat pipe cooking vessel provides improved temperature uniformity relative to conventional cooking devices.

While the example embodiment discussed above includes a ceramic heater used in conjunction with a heat pipe cooking vessel, it will be appreciated that the ceramic heater and the cooking vessel of the present disclosure may be used separately from each other in different heating and/or cooking applications. That is, the ceramic heater of the present disclosure may be used with a conventional cooking vessel, and the heat pipe cooking vessel of the present disclosure may be used with conventional heaters.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A cooking vessel, comprising:
a food receptacle for holding food during cooking;
an inner shell and an outer shell, an outside surface of the inner shell forms the food receptacle, a portion of an inside surface of the inner shell is spaced from a portion of an inside surface of the outer shell forming a sealed volume between the inner shell and the outer shell; and
a heat pipe positioned within the sealed volume between the inner shell and the outer shell for distributing heat through the sealed volume between the inner shell and the outer shell, wherein the heat pipe includes a working fluid configured to change from a liquid state to a vapor state upon absorbing heat within an evaporation zone positioned within the sealed volume between the inner shell and the outer shell and to release heat upon changing from the vapor state to the liquid state within a condensation zone positioned within the sealed volume between the inner shell and the outer shell.

2. The cooking vessel of claim 1, wherein each of the inner shell and the outer shell includes a respective bottom wall and a respective side wall, a portion of the bottom wall of the inner shell is spaced from a portion of the bottom wall of the outer shell and a portion of the side wall of the inner shell is spaced from a portion of the side wall of the outer shell such that the sealed volume extends between the bottom walls of the inner shell and the outer shell and between the side walls of the inner shell and the outer shell.

3. The cooking vessel of claim 2, wherein the side wall of the inner shell is integrally joined with the side wall of the outer shell along an upper rim of the cooking vessel sealing the sealed volume between the inner shell and the outer shell.

4. The cooking vessel of claim 2, wherein the heat pipe is positioned in a gap between the bottom walls of the inner shell and the outer shell and in a gap between the side walls of the inner shell and the outer shell for transferring heat received at an outside surface of the bottom wall of the outer shell from the gap between the bottom walls of the inner shell and the outer shell to the gap between the side walls of the inner shell and the outer shell.

5. The cooking vessel of claim 1, wherein the heat pipe includes a wick structure positioned on at least one of the inside surface of the inner shell and the inside surface of the outer shell.

6. The cooking vessel of claim 5, wherein the wick structure includes a sintered metal on at least one of the inside surface of the inner shell and the inside surface of the outer shell.

7. The cooking vessel of claim 5, wherein the wick structure includes an arc sprayed metal on at least one of the inside surface of the inner shell and the inside surface of the outer shell.

8. The cooking vessel of claim 5, wherein the wick structure includes a mesh positioned on at least one of the inside surface of the inner shell and the inside surface of the outer shell.

9. The cooking vessel of claim 5, wherein the wick structure includes grooves formed along at least one of the inside surface of the inner shell and the inside surface of the outer shell.

* * * * *